(12) United States Patent
Stocker

(10) Patent No.: US 9,912,471 B2
(45) Date of Patent: Mar. 6, 2018

(54) METHOD FOR OPERATING A PORTABLE DATA CARRIER, AND SUCH A PORTABLE DATA CARRIER

(71) Applicant: GIESECKE & DEVRIENT GMBH, Munich (DE)

(72) Inventor: Thomas Stocker, Munich (DE)

(73) Assignee: GEISECKE+DEVRIENT MOBILE SECURITY GMBH, Munich (DE)

(*) Notice: Subject to any disclaimer, the term of this patent is extended or adjusted under 35 U.S.C. 154(b) by 6 days.

(21) Appl. No.: 14/654,280

(22) PCT Filed: Dec. 16, 2013

(86) PCT No.: PCT/EP2013/003802
§ 371 (c)(1),
(2) Date: Jun. 19, 2015

(87) PCT Pub. No.: WO2014/095031
PCT Pub. Date: Jun. 26, 2014

(65) Prior Publication Data
US 2015/0333903 A1    Nov. 19, 2015

(30) Foreign Application Priority Data
Dec. 21, 2012 (DE) .................. 10 2012 025 416

(51) Int. Cl.
*H04L 9/00*  (2006.01)
*G06F 21/64* (2013.01)
*H04L 9/32*  (2006.01)

(52) U.S. Cl.
CPC .............. *H04L 9/003* (2013.01); *G06F 21/64* (2013.01); *H04L 9/3239* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 7,409,608 B1 | 8/2008 | Ferrucci et al. | |
| 7,490,350 B1 * | 2/2009 | Murotake | G06F 21/85 726/11 |
| 8,881,261 B1 * | 11/2014 | Shigapov | H04L 63/08 726/15 |

(Continued)

FOREIGN PATENT DOCUMENTS

WO    2012026996 A1    3/2012

OTHER PUBLICATIONS

Benoit et al., "Efficient Use of Random Delays," International Association for Cryptologic Research, Aug. 14, 2006, pp. 1-8, vol. 20060815:200427.

(Continued)

*Primary Examiner* — Henry Tsang
(74) *Attorney, Agent, or Firm* — Workman Nydegger

(57) ABSTRACT

A method for operating a portable data carrier includes a processing unit for processing commands and a memory unit for storing data, with random wait states being inserted into the processing of the commands for thwarting SPA/DPA attacks. An actual checksum may be computed over the data of a selected region of the memory unit during a random wait state. A portable data carrier is arranged for executing the method.

7 Claims, 2 Drawing Sheets

(56) References Cited

U.S. PATENT DOCUMENTS

| | | | | |
|---|---|---|---|---|
| 2006/0253675 | A1* | 11/2006 | Johannes Bloks | G06F 9/4887 711/167 |
| 2012/0324321 | A1* | 12/2012 | Chowdhury | H03M 13/09 714/807 |
| 2013/0064362 | A1* | 3/2013 | Tang | H04L 9/002 380/29 |
| 2013/0219187 | A1* | 8/2013 | Furtner | G06F 21/558 713/189 |

OTHER PUBLICATIONS

Coron et al., "An Efficient Method for Random Delay Generation in Embedded Software," Cryptographic Hardware and Embedded Systems—CHES 2009 (Book Series: Lecture Notes in Computer Sciences), Sep. 6, 2009, pp. 156-170.
German Search Report for corresponding German Application No. 102012025416.4, dated Jan. 16, 2014.
International Search Report for corresponding International PCT Application No. PCT/EP2013/003802, dated Apr. 28, 2014.
Schinzel, "An Efficient Mitigation Method for Timing Side Channels on the Web," COSADE 2011—2nd International Workshop on Constructive Side-Channel Analysis and Secure Design, Feb. 25, 2011, pp. 1-6, URL:http://colonwq.org/_download/cosade-2011-extended-abstract.pdf.

* cited by examiner

METHOD FOR OPERATING A PORTABLE DATA CARRIER, AND SUCH A PORTABLE DATA CARRIER

BACKGROUND

This invention relates to a method for operating a portable data carrier and to such a portable data carrier. In particular, the invention relates to a method for operating a chip card or a chip module, and to such a chip card or such a chip module.

Portable data carriers in the form of chip cards having a processing unit, also called microprocessor chip cards or processor cards, are used in many security-critical areas, for example as identity documents, for proving a subscriber's access authorization, e.g. for a mobile radio network, or for carrying out funds transfer transactions. Such use of the chip card is frequently effected in interaction with a terminal device provided for the particular application, which is configured for accessing security-critical data of such a chip card after an authentication has been effected.

When security-critical applications are carried out by a portable data carrier, for example a chip card, it is necessary to protect the portable data carrier and the security-critical data deposited therein, such as cryptographic keys, from attacks and unauthorized tampering.

Various attack methods are known by which physical parameters of the portable data carrier are measured during the program execution in order to make inferences about security-critical data, in particular cryptographic keys, that are employed upon the program execution. For example, in simple power analysis (SPA) the power consumption of the portable data carrier during the run of a program routine is measured and examined. In differential power analysis (DPA), in contrast, the power consumption over many program runs is evaluated statistically.

SUMMARY

The hereinabove mentioned attacks are generally designated side-channel attacks because the information flow is not effected via the primary communication channel of the portable data carrier, but bypasses it. Section 16.5 of the book "Handbuch der Chipkarten" ("Smart Card Handbook") by Wolfgang Rankl and Wolfgang Effing, 5th edition, gives an overview of various attack and defense methods in portable data carriers. Page 756 of this section describes the employment of random wait states (also called "random delays" in the literature) as a measure against SPA/DPA attacks. Such random wait states are inserted into the routines to be executed by the processing unit of the portable data carrier, for example into a PIN routine or an encryption routine, in order to interrupt the "normal" processing of commands for a randomly determined time duration. The employment of random wait states in the processing of commands by the processing unit of a portable data carrier impedes the synchronization of the power curves that is required for the power analysis. On the processing unit of the portable data carrier, such random wait states can be implemented for example by means of program loops in whose loop bodies nothing happens except for the incrementing of a counter and/or the executing of a NOP ("no operation") command.

Against this background, the invention is based on the object of providing an alternative method for operating a portable data carrier and a corresponding portable data carrier that are in particular resistant to SPA and DPA attacks.

The invention is based on the fundamental idea of not for example running through a waiting loop in which "nothing" happens, as in the prior art, during a random wait state, but rather utilizing said random wait state by the processing unit for checking whether data deposited on a memory unit of the portable data carrier are still intact or have possibly already been corrupted by an attack.

On the basis of this fundamental idea, there is provided according to a first aspect of the invention a method for operating a portable data carrier having a processing unit for processing commands and a memory unit for storing data, with random wait states being inserted into the processing of the commands, i.e. between the commands, in particular for thwarting SPA/DPA attacks. The method is characterized in that an actual checksum is computed over the data of a selected region of the memory unit by the processing unit during a random wait state.

Preferably, the method comprises the further step of comparing the actual checksum computed over the data of a selected region of the memory unit with an expected or reference checksum for the data of said selected region of the memory unit. The further operation of the portable data carrier can be blocked if the comparison of the actual checksum with the expected checksum yields that the actual checksum does not match the expected checksum. Preferably, the steps of computing the actual checksum over the data of a selected region of the memory unit and of comparing the actual checksum with an expected checksum are begun and terminated within a random wait state.

According to preferred embodiments of the invention, the computation of the actual checksum over the data of a selected region of the memory unit extends over more than one random wait state. Preferably, the commands to be processed by the processing unit are part of a command routine, with the computation of the actual checksum over the data of a selected region of the memory unit being terminated after the processing of the last command of the command routine within the context of a random wait state, an idle state or a wait state having a duration pre-specified by the processing unit.

Preferably, the selected region of the memory unit for computing the actual checksum over the data stored therein by the processing unit is selected on the basis of the duration of the random wait state.

According to preferred embodiments of the invention, the random wait state is subdivided into two substantially equally long portions, with an actual checksum being computed over the data of one and the same selected region of the memory unit during both portions of the random wait state.

Preferably, the actual checksum is a CRC checksum or a cryptographic checksum, with the cryptographic checksum being generated while employing a symmetric and/or asymmetric cryptographic method, in particular on the basis of cryptographic hash functions, such as SHA-1, MD5, HMAC-SHA1, HMAC-MD5, AES-CBC-MAC and the like, or on the basis of signatures with suitable signature algorithms, such as RSA, DSA, EC-DSA, and the like.

According to a second aspect of the invention, there is provided a portable data carrier having a processing unit and a memory unit, which is configured for being operated by one of the hereinabove described methods according to the first aspect of the invention. Preferably, the portable data carrier is a chip card or a chip-card module.

An essential advantage of the invention is that, in comparison to known random wait states in which "nothing" happens and which thus have a very similar, if not even identical, power curve, the random wait times according to the invention lead to different power curves due to the access to different regions of the memory unit with different sizes. For an attacker it is thus more difficult to determine in a power curve when the processing unit is in a random wait state.

BRIEF DESCRIPTION OF THE DRAWINGS

Further features, advantages and objects of the invention will emerge from the following detailed description of several exemplary embodiments and alternative embodiments. Reference is made to the drawings, in which there are shown.

DETAILED DESCRIPTION OF VARIOUS EMBODIMENTS

Figure 1:
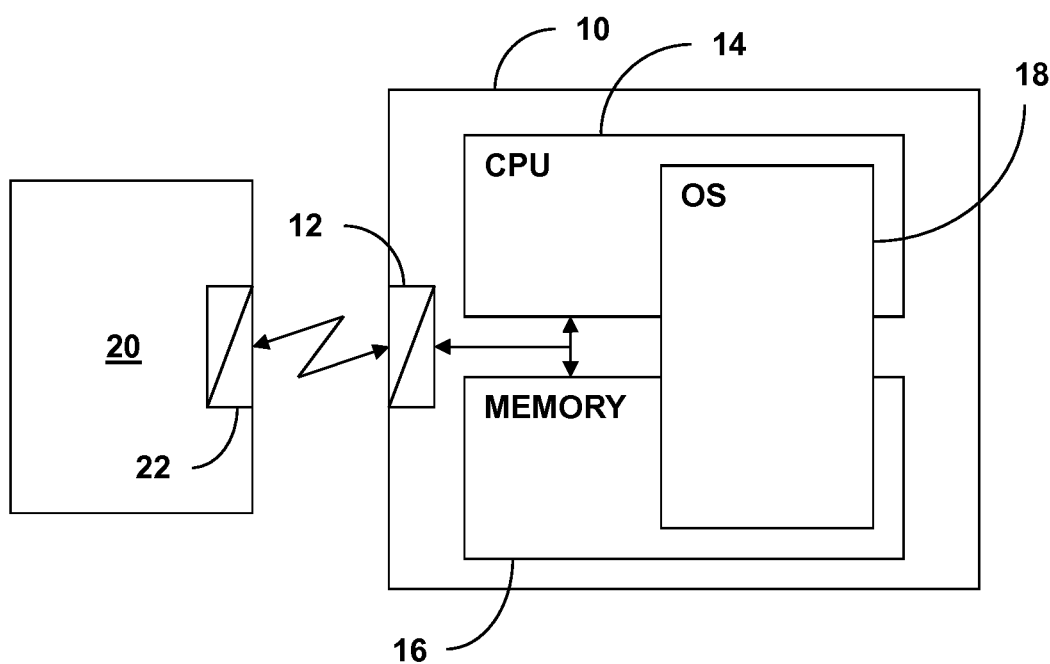
FIG. 1 a schematic representation of a preferred embodiment of a portable data carrier according to the invention in the form of a chip card in communication with a terminal device, FIG. 2 a schematic representation of a preferred operational mode of the processing unit of the chip card of FIG. 1 upon the processing of commands while employing random wait states, and FIG. 3 a schematic detail view of a random wait state of FIG. 2 according to a preferred embodiment of the invention.

FIG. 1 shows a schematic representation of a preferred embodiment of a portable data carrier according to the invention in the form of a chip card 10. The chip card 10 is configured for exchanging data with an external entity in the form of a terminal device 20. An exchange of data is understood here to be a signal transmission, a mutual control and in simple cases also a connection between the chip card 10 and the terminal device 20. In general a data exchange can be described by the transmitter-receiver model known from information theory: data or information items are encoded into symbols and then transmitted from a transmitter to a receiver via a transmission channel. It is decisive here that the transmitter and the receiver employ the same coding in order that the receiver can understand the message, i.e. can decode the received data.

For data transfer or communication between the chip card 10 and the terminal device 20, both the chip card 10 and the terminal device 20 have suitable communication or IO interfaces 12 and 22. The IO interfaces 12 and 22 can be configured for example such that the communication there between or between the chip card 10 and the terminal device 20 is effected contactlessly, i.e. via the over-the-air interface, as is indicated in FIG. 1. Alternatively, the chip card 10 can be connected to the IO interface 22 of the terminal device 20 via the IO interface 12 galvanically, i.e. using physical contacts. In this case, the IO interface 12 normally comprises a contact pad disposed on the chip card 10 and having a plurality of contact areas for data exchange with the terminal device 20. The present invention of course also includes portable data carriers in which the IO interface 12 is configured both for contact-type and for contactless communication with the terminal device 20 and which are known to the skilled person in connection with chip cards as dual-interface chip cards.

Besides the IO interface 12 for communication with the terminal device 20, the portable data carrier 10 in the form of a chip card comprises a central processing unit (CPU) 14. As is known, the principal functions of the processing unit 14 are to execute arithmetic and logic functions and to read and write data, as is defined by a computer program in the form of machine commands that runs on the processing unit 14.

The portable data carrier 10 further comprises a memory unit 16 having a volatile working memory (RAM) for example for taking up the machine commands of a computer program to be executed by the processing unit 14. Further, the memory unit 16 comprises a non-volatile, preferably re-writable memory. Preferably, the non-volatile memory is a flash memory (flash EEPROM), which can consist of a multiplicity of pages. It may be for example a flash memory having a NAND architecture or a NOR architecture. The memory unit 16 can of course also comprise a read only memory (ROM).

As is known to the skilled person, the communication between the processing unit 14, the memory unit 16, the IO interface 12 and any further components of the portable data carrier 10 in the form of a chip card can preferably be effected via one or more data, address and/or control buses, as is indicated schematically in FIG. 1 by arrows.

The skilled person will further appreciate that a portable data carrier 10 according to the invention can also have electronic components other than those represented in FIG. 1. Thus, the portable data carrier 10 could for example further have a memory management unit (MMU) interacting with the processing unit 14 for managing the memory unit 16, or a coprocessor for carrying out cryptographic computations. Further, the portable data carrier 10 could comprise a UART (universal asynchronous receiver transmitter), which could also be part of the IO interface 12 of the portable data carrier 10. As is known to the skilled person, a UART is an electronic component for transmitting and receiving data that works asynchronously independently of the processing unit 14. With a UART it is no longer necessary to have the communication with the terminal device 20 handled by the processing unit 14 on the bit and byte level. This leads to a simplification of the communication protocols and can also be utilized for realizing higher data transfer speeds than with a pure software solution through the processing unit 14.

In the non-volatile memory of the memory unit 16 there is preferably deposited an operating system 18 that is executed by the processing unit 14 during operation of the chip card 10 and accesses the memory unit 16 from time to time, as is represented schematically in FIG. 1. The operating system 18 is configured in particular for processing commands coming in from the terminal device 20, which preferably have the form of command APDUs and can be part of larger routines, and for creating a corresponding response and transmitting it to the terminal device 20 again, preferably in the form of a response APDU. For further details concerning the structure of APDUs, reference is made to section 8.3 of the book "Handbuch der Chipkarten" ("Smart Card Handbook") by Wolfgang Rankl and Wolfgang Effing, 5th edition, which is completely incorporated herein by reference.

Figure 2:
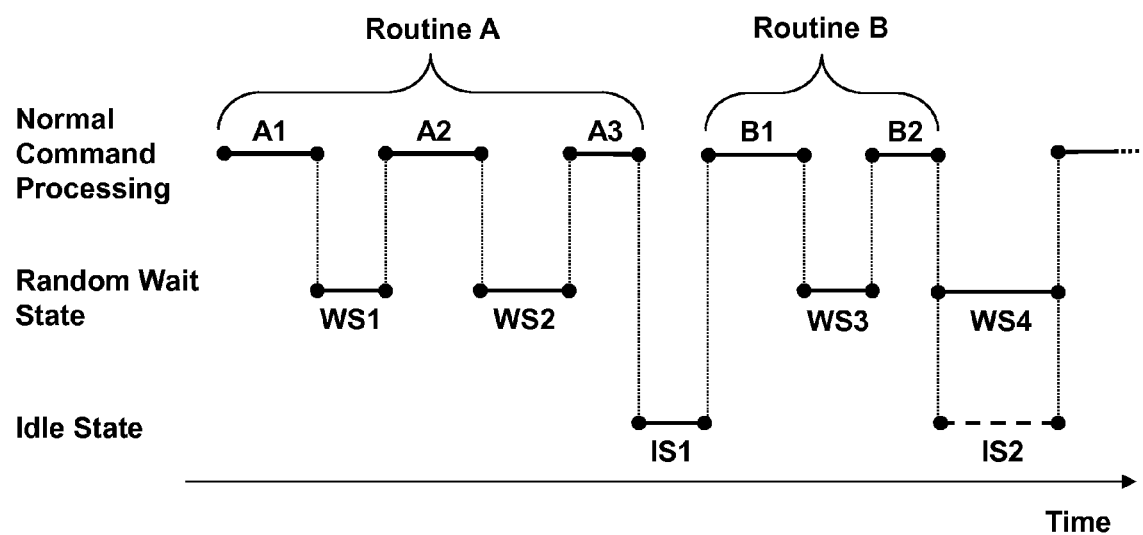

FIG. 2 shows a schematic representation of an operational mode, that is preferred according to the invention, of the chip card 10 upon the processing by its processing unit 14 of commands or instructions, which can respectively be part of a more extensive routine. Three different states in which the processing unit 14 can be are represented here over a time axis, namely, a state of "normal" command processing, a random wait state, or an idle state.

In FIG. 2, the processing unit 14 by way of example thus begins to process the command A1, which is part of the routine A, which may be for example a PIN routine or an encryption routine. The command A can be based on a command APDU coming from the terminal device 20. Alternatively or additionally, the command A1 or the routine A can be part of an application that is executed on the portable data carrier 10.

After the processing of the command A1, the processing unit 14 enters a random wait state WS1, with the duration of the wait state being determined randomly. As described hereinabove, such a random wait state serves in particular to make an SPA/DPA attack come to nothing, since it is impossible, due to the random, unpredictable duration of the wait states, to synchronize different power curves and use statistical methods to make inferences about the data being included in the processing. This employment of random wait states for thwarting SPA/DPA attacks is known in principle to the skilled person, so that further details thereof need not be described.

According to the invention it is now provided that a waiting loop in which "nothing" happens is not run through by the processing unit 14 during the random wait state WS1, as in the prior art, but that the random wait state WS1 is utilized by the processing unit 14 for carrying out at least one further defensive measure against potential attacks on the portable data carrier 10.

Preferably, the random wait state WS1 is employed for checking whether data deposited on the memory unit 16 are still intact or have possibly already been corrupted by an attack. For this purpose, a region to be checked in the memory unit 16 is first selected, for example a region of the memory unit 16 in which security-critical data are deposited, and an actual checksum computed by means of the data deposited there. As is known to the skilled person, a comparison of the thus determined actual checksum with an expected checksum computed on the basis of the same data at an earlier time point makes it possible to check whether the data have been changed. If the actual checksum deviates from the expected checksum, this could indicate an attack by which the data deposited in the checked region of the memory unit 16 have been corrupted, for example by one or more bits having been flipped, which is also known to the skilled person as a bit flip. According to preferred embodiments of the invention, the expected checksum over the selected region of the memory unit 16 could have been created and deposited in the memory unit 16 upon the initialization or personalization of the portable data carrier 10. The comparison between the expected checksum and the actual checksum of the data from the selected region of the memory unit 16 can also be effected during the random wait state WS1.

In the exemplary schematic representation of FIG. 2, the random wait state WS1 is followed by the command A2 to be processed by the processing unit 14, which is in turn followed by a further random wait state, namely, the random wait state WS2. As with the random wait state WS1, the duration of the random wait state WS2, which in FIG. 2 is a little longer than the duration of the random wait state WS1 by way of example, is also based on a random number. According to the invention, said further random wait state WS2 is also utilized for checking whether data deposited in a selected region of the memory unit 16 are still intact or have possibly been corrupted by an attack, by an actual checksum being formed over the data of a selected region of the memory unit 16 and compared with an expected checksum. The random wait state WS2 is in turn followed by a command to be processed by the processing unit 14, namely, the command A3, whose processing terminates the exemplary routine A.

According to preferred embodiments of the invention, the respective computations of the actual checksums as well as the respective comparisons with the corresponding expected checksums in the random wait states WS1 and WS2 can be effected independently of each other, i.e. during the random wait state WS1 an actual checksum can be formed over the data of a first selected region of the memory unit 16 and compared with a corresponding expected checksum, and during the random wait state WS2 a further actual checksum can be formed over the data of a second selected region of the memory unit 16 which differs from the first selected region of the memory unit 16 and compared with a corresponding expected checksum.

Alternatively, it can be provided according to the invention that the computations of the actual checksums are carried out over a contiguous region of the memory unit 16 in the random wait states WS1 and WS2. In other words, an intermediate result of the checksum computation over a selected region of the memory unit 16 begun with the random wait state WS1 can be stored at the end of the random wait state WS1, and the computation of the actual checksum can be resumed on the basis of said intermediate result after the processing of the command A2 with the subsequent random wait state WS2, during which the comparison with a corresponding expected checksum is then preferably also effected. Of course, according to the invention a checksum computation and a comparison with an expected checksum can also extend over more than two random wait states.

Since at the beginning of a routine it may not be exactly known how many random wait states will occur in the routine and how long they will last, it may happen that the random wait states inserted into a routine manage do not suffice for completely terminating the checksum computation over a selected region of the memory unit 16, for example because the selected region of the memory unit 16 is too large. To avoid the intermediate result of a checksum computation being stored beyond a routine processed by the processing unit 14, it is possible according to preferred embodiments of the invention to carry out the remainder of the checksum computation (as well as the comparison with a corresponding expected checksum) subsequent to the processed routine. For this purpose, the processing unit 14 is preferably configured for adding a further random wait state to the processed routine, as is represented in FIG. 2 by way of example by the routine B and the wait state WS4.

In the routine B represented in FIG. 2, the processing unit 14 enters the random wait state WS3 after the processing of a first command B1 and begins computing an actual checksum over a selected region of the memory unit 16. The computation of the actual checksum is interrupted as soon as the random wait state WS3 is over and the processing unit 14 begins processing the command B2. The intermediate result can be stored intermediately, for example in the form of the hitherto ascertained value of the actual checksum including information about how far the computation has hitherto come, for example the address of the last data element that was included in the computation of the checksum. Although the processing unit 14 also terminates the processing of the exemplary routine B represented in FIG. 2 with the processing of the command B2, the checksum computation begun in the random wait state WS3 is not yet terminated. Hence, in such a case it is provided according to the invention that the processing of the command B2, and thus the routine B, is followed by a further random wait state WS4 within which the computation of the actual checksum over the data of the selected region of the memory unit 18 that have not yet been considered can be terminated and the comparison with a corresponding expected checksum carried out.

As described hereinabove, the duration of the wait state WS4 can be random according to the invention. Alternatively, the duration of the wait state WS4 can be determined by the processing unit 14, i.e. it is not for example pre-specified as a random number by a random number generator, but determined by the processing unit 14 for example on the basis of the amount of the data of the selected region of the memory unit 16 that have hitherto not yet been included in the checksum computation. As the skilled person will appreciate, the duration thus determined by the processing unit 14 for the wait state WS4 will be of different length upon each processing of the routine B, since the duration of the random wait state WS3 will also be of different length upon each processing.

According to a further alternative of the invention, the processing unit 14 could also enter an idle state IS2 instead of the random wait state WS4 after the processing of the command B2 in order to terminate the computation of the actual checksum and compare it with a corresponding expected checksum, as is represented schematically in FIG. 2 by the dashed idle state IS2. The idle state is characterized in that it is left again as soon as a new command is ready for processing, i.e. in this state the chip card 10 normally waits for commands from the terminal device 20. According to the invention, the idle state IS1 represented in FIG. 2 can likewise be utilized for checksum computation. As in the case of the random wait states WS1 and WS2, a checksum computation as well as a comparison with a corresponding expected checksum can extend over a plurality of idle states.

The skilled person will appreciate that the employment of larger regions of the memory unit 16 upon computation of the actual checksums offers the advantage that fewer expected checksums must be stored and fewer comparisons between actual and expected checksums carried out, so that less memory space and less computing capacity is used. A further advantage of the hereinabove described preferred embodiment is that the "free computing time" of the processing unit 14 available during a random wait state is exploited completely.

For the reverse case of the processing unit 14 finishing the computation of the actual checksum and the comparison with a corresponding expected checksum before the expiration of a random wait state, it can be provided according to preferred embodiments of the invention that the processing unit 14 enters a random wait state according to the prior art for the remaining duration of the random wait state, i.e. enters a state in which the processing unit 14 runs through a waiting loop for example.

According to preferred embodiments of the invention, the checksum may involve for example a cyclic redundancy check (CRC) with which the integrity of the data deposited on the memory unit 16 is ascertainable. Preferably, according to alternative embodiments, the checksum can be a cryptographic checksum, with the cryptographic checksum being generated while employing a cryptographic secret, in particular while employing a symmetric and/or asymmetric cryptographic method. Arbitrary methods for generating such checksums as known per se from the prior art can be employed here, in particular on the basis of cryptographic hash functions, such as SHA-1, MD5, HMAC-SHA1, HMAC-MD5, AES-CBC-MAC. Likewise, the checksum can be generated on the basis of signatures with suitable signature algorithms, such as RSA, DSA, EC-DSA, and the like. Besides the hereinabove mentioned preferred checksums, a multiplicity of further checksums are known to the skilled person that are suitable according to the invention for checking the integrity of the data deposited on the memory unit 16. For the details of further checksums that can be used according to the invention, reference is made to chapter 6.5 of the book "Handbuch der Chipkarten" ("Smart Card Handbook") by Wolfgang Rankl and Wolfgang Effing, 5th edition, 2008, which is completely incorporated herein by reference.

As the skilled person will appreciate, the duration of the random wait state is known to the processing unit 14 at the beginning of a random wait state, since it is determined in advance for example by means of a random number generator. Preferably, the processing unit 14 is configured for selecting a region suitable for checksum computation on the basis of said duration of a random wait state that is known to the processing unit 14. The choice of the suitable region of the memory unit 16 can depend on the duration of the random wait state. If said duration is short an accordingly small region is selected, and if said duration is long an accordingly large region of the memory unit 16 is selected. Preferably, the region of the memory unit 16 is so selected according to its size that the computation of the actual checksum is completely terminated and the actual checksum has been compared with a corresponding expected checksum at the end of a random wait state at the latest.

It is conceivable for example that the memory unit 16 has deposited therein a list of expected checksums for a multiplicity of selected regions of the memory unit 16 together with information about how long the computation of the checksum of the corresponding selected region lasts. By means of the known duration of a wait state the processing unit can select a suitable region of the memory unit 16. Alternatively or additionally, the processing unit 14 can be configured for selecting a suitable region of the memory unit 16 "on the fly", by the maximum size of a region of the memory unit 16 for which a checksum can still be computed during the random wait state being determined on the basis of an average access time to the memory unit 16.

The skilled person will appreciate that the hereinabove described determination or selection of a suitable region of the memory unit 16 by the processing unit 14 can also be employed according to the invention when the computation of a checksum extends over a plurality of random wait states that are inserted into a routine having a plurality of commands that is to be processed by the processing unit 14, as was described hereinabove as a preferred embodiment. For in this case the processing unit 14 knows the number of the commands of a routine and thus the number of the wait states to be inserted into said routine as well as the approximate average duration of a wait state on the basis of which it is possible to estimate the "computing time" of the processing unit 14 that is available for checksum computation and a comparison with a corresponding expected checksum.

For the preferred case that the memory unit 16 comprises a flash memory, the selected region of the memory unit 16 may be one or more pages of the flash memory, in particular those pages having deposited therein security-critical data whose integrity is necessary for a correct functioning of the chip card 10.

Figure 3:
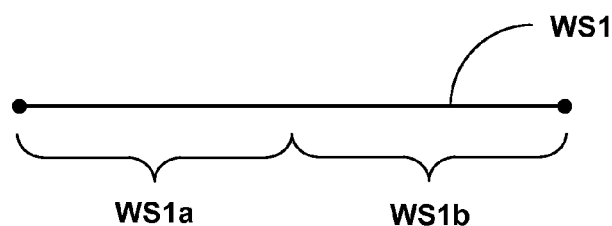

FIG. 3 shows a schematic detail representation of the random wait state WS1 according to a preferred embodiment of the invention. The preferred embodiment represented in FIG. 3 differs from the embodiment described in connection with FIG. 2 substantially in that during the duration of the random wait state WS1 an actual checksum is not computed and compared with a corresponding expected checksum, or only a part thereof computed, but rather the duration of the random wait state WS1 is subdivided into two preferably substantially equally long portions WS1a and WS1b. Such a subdivision into the portions WS1a and WS1b can be performed by the processing unit 14, since the duration of the random wait state WS1 is determined by the processing unit 14 preferably in advance (for example by means of a random number generator) and is thus known thereto.

Preferably, a first actual checksum is computed over the data of a previously selected region of the memory unit 16 during the first portion WS1a of the random wait state WS1, and a second actual checksum during the second portion WS1b. The first actual checksum and the second actual checksum can be compared with each other and/or with a corresponding expected checksum for said region of the memory unit 16. A particular advantage of the preferred embodiment represented in FIG. 3 is that one can recognize in time proximity whether a light attack has taken place during the random wait state WS1, so that corresponding countermeasures can be taken, such as blocking the chip card 10. For this can be the case when the first actual checksum determined during the portion WS1a does not match the second actual checksum determined during the portion WS1b.

The invention claimed is:

1. A method for operating a dual-interface portable data carrier having a processing unit for processing commands, a memory unit for storing data, a first contact-type interface for communication with a terminal device, and a second contactless interface for communication with the terminal device, the method comprising:
    inserting random wait states into the processing of the commands for thwarting simple power analysis (SPA) or differential power analysis (DPA) attacks;
    computing an actual checksum over the data of a selected physical region of the memory unit during a random wait state, wherein the selected physical region of the memory unit for computing the actual checksum over the data stored therein by the processing unit is variable and is selected based on a duration of the random wait state;
    determining an expected checksum for the data of said selected physical region of the memory unit;
    comparing the actual checksum computed over the data of the selected physical region of the memory unit with the determined expected checksum for the data of said selected physical region of the memory unit; and
    blocking a further operation of the portable data carrier if the comparison of the actual checksum with the expected checksum yields that the actual checksum does not match the expected checksum.

2. The method according to claim 1, wherein the steps of computing the actual checksum over the data of the selected physical region of the memory unit and of comparing the actual checksum with the expected checksum are begun and terminated within the random wait state.

3. The method according to claim 1, wherein the computation of the actual checksum over the data of the selected physical region of the memory unit extends over more than one random wait state.

4. The method according to claim 3, wherein the commands to be processed by the processing unit are part of a command routine, and wherein the computation of the actual checksum over the data of the selected physical region of the memory unit is terminated after the processing of a last command of the command routine within a context of the random wait state, an idle state or a wait state having a duration pre-specified by the processing unit.

5. The method according to claim 1, wherein the random wait state is subdivided into two substantially equally long portions, with the actual checksum being computed over the data of the same selected physical region of the memory unit during both portions of the random wait state.

6. The method according to claim 1, wherein the actual checksum is a cyclic redundancy check (CRC) checksum or a cryptographic checksum, with the cryptographic checksum being generated while employing a symmetric and/or asymmetric cryptographic method on the basis of cryptographic hash functions including SHA-1, MD5, HMAC-SHA1, HMAC-MD5, AES-CBC-MAC, or on the basis of signatures with suitable signature algorithms including RSA, DSA, EC-DSA.

7. A portable data carrier comprising: a processor and a memory, wherein the memory of the portable data carrier stores instructions that when executed by the unit processor perform a method including:
    inserting random wait states into a processing of commands performed by the processor of the portable data carrier for thwarting simple power analysis (SPA) or differential power analysis (DPA) attacks;
    computing an actual checksum over data stored in a selected physical region of the memory during a random wait state, wherein the selected physical region of the memory for computing the actual checksum over the data stored therein by the processor is variable and is selected based on a duration of the random wait state;
    determining an expected checksum for the data of said selected physical region of the memory;
    comparing the actual checksum computed over the data of the selected physical region of the memory with the determined expected checksum for the data of said selected physical region of the memory; and
    blocking a further operation of the portable data carrier if the comparison of the actual checksum with the expected checksum yields that the actual checksum does not match the expected checksum.

* * * * *